US008565080B2

(12) United States Patent
Kavanaugh et al.

(10) Patent No.: US 8,565,080 B2
(45) Date of Patent: Oct. 22, 2013

(54) METHOD AND APPARATUS FOR MANAGING COMMUNICATIONS IN A WIRELESS COMMUNICATION SYSTEM

(75) Inventors: Richard Thomas Kavanaugh, Encinitas, CA (US); Gustav Gerald Vos, Surrey, CA (US)

(73) Assignee: Sierra Wireless, Inc., Richmond (CA)

( * ) Notice: Subject to any disclaimer, the term of this patent is extended or adjusted under 35 U.S.C. 154(b) by 266 days.

(21) Appl. No.: 13/027,750

(22) Filed: Feb. 15, 2011

(65) Prior Publication Data

US 2011/0199901 A1   Aug. 18, 2011

Related U.S. Application Data

(60) Provisional application No. 61/304,749, filed on Feb. 15, 2010.

(51) Int. Cl.
*H04W 28/10* (2009.01)
(52) U.S. Cl.
USPC ........... 370/230; 370/235; 370/252; 370/254; 370/328; 455/453
(58) Field of Classification Search
None
See application file for complete search history.

(56) References Cited

U.S. PATENT DOCUMENTS

| | | | |
|---|---|---|---|
| 5,418,843 A | 5/1995 | Stjernholm | |
| 6,112,101 A | 8/2000 | Bhatia et al. | |
| 6,754,179 B1 * | 6/2004 | Lin | 370/235 |
| 6,937,863 B1 | 8/2005 | Gordon et al. | |
| 7,426,194 B2 | 9/2008 | Shenfield et al. | |
| 7,489,636 B1 | 2/2009 | Cheung | |
| 2004/0072565 A1 * | 4/2004 | Nobukiyo et al. | 455/436 |
| 2004/0203834 A1 | 10/2004 | Mahany | |
| 2006/0142021 A1 * | 6/2006 | Mueckenheim et al. | 455/453 |
| 2007/0242606 A1 * | 10/2007 | Chen | 370/235 |
| 2007/0259673 A1 | 11/2007 | Willars et al. | |
| 2008/0120512 A1 | 5/2008 | Wang | |
| 2008/0151838 A1 | 6/2008 | Lauderdale et al. | |
| 2008/0209035 A1 | 8/2008 | Barranco et al. | |
| 2008/0233922 A1 | 9/2008 | Lesrel | |

(Continued)

FOREIGN PATENT DOCUMENTS

| | | |
|---|---|---|
| EP | 1 617 606 | 1/2006 |
| EP | 1 903 349 | 3/2008 |

(Continued)

OTHER PUBLICATIONS

Digi International Inc., White Paper: Efficient Data Transfer over Cellular Networks, 2010.

(Continued)

*Primary Examiner* — Chi Pham
*Assistant Examiner* — Shick Hom
(74) *Attorney, Agent, or Firm* — DLA Piper LLP (US)

(57) ABSTRACT

The present technology provides a method and apparatus for managing communications in a wireless communication system. The method and apparatus evaluate one or more network traffic levels, each network traffic level associated with a respective network sector, and submit access-configuration messages in one or more network sectors when the evaluated network traffic level of a particular network sector has a predetermined relation to the traffic threshold for that particular network sector. The access-configuration messages are configured to shift one or more wireless devices into one or more predetermined operational conditions. The present technology further provides corresponding wireless devices.

15 Claims, 5 Drawing Sheets

(56) References Cited

U.S. PATENT DOCUMENTS

| | | |
|---|---|---|
| 2008/0313255 A1 | 12/2008 | Geltner et al. |
| 2010/0159944 A1* | 6/2010 | Pascal et al. ............... 455/456.1 |
| 2010/0246404 A1* | 9/2010 | Bradford et al. ............. 370/237 |

FOREIGN PATENT DOCUMENTS

| | | |
|---|---|---|
| EP | 2 234 441 | 9/2010 |
| WO | WO 2004/006603 | 1/2004 |
| WO | WO 2004/034715 | 4/2004 |
| WO | WO 2005/017707 | 2/2005 |
| WO | WO2009/000908 | 12/2008 |
| WO | 2009/100756 | 8/2009 |
| WO | WO 2009/127254 | 10/2009 |

OTHER PUBLICATIONS

K.D. Water, "Implementing M2M applications via GPRS, EDGE and UMTS", M2M Alliwance e.V., Aachen, Germany 2010.

3GPP TS 22.368 V1.0.0: "Service requirements for machine-type communications", Stage 1 (Release 10), Aug. 2009.

3GPP TS 22.368 v1.1.1: "Service requirements for machine-type communications", Stage 1 (Release 10), Nov. 2009.

3GPP TR 22.868 V8.0.0: "Study on Facilitating Machine to Machine Communication in 3GPP Systems", (Release 8), Mar. 2007.

Aïache et al., "A load dependent metric for balancing Internet traffic in Wireless Mesh Networks", Thales Communications, France, 2008.

Chantaraskul et al., "An intelligent-agent approach for congestion management in 3G networks", Abstract—J. of Comp. Science, 2007.

Diaz, "Customer-centric measurements on mobile phones", (Abstract) IEEE Intern. Symposium on Consumer Electronics, 2008.

Du et al., "Intelligent Cellular Network Load Balancing Using a Cooperative Negotiation Approach," 2003 IEEE Wireless Communications and Networking (WCNC 2003), vol. 3, pp. 1675-1679, Mar. 2003.

Inamura et al., "TCP over Second (2.5G) and Third (3G) Generation Wireless Networks", RFC 3481.

Kumar et al., "Ubiquitous Computing for Remote Cardiac Patient Monitoring: A Survey", Hindawi Publishing Corp. 2008.

Nadas et al., "Providing congestion control in the Iub Transport Network for HSDPA"; IEEE Globecom 2007 Proc.

Schols, "Notes on Delay-Insensitive Communication," Computing Science Notes, Eindhoven University of Technology, 1988.

3GPP TS 23.107 V3.0.0: "QoS Concept and Architecture," Oct. 1999.

Vos et al., U.S. Appl. No. 13/165,555 Office Action mailed Apr. 12, 2013.

Vos et al., U.S. Appl. No. 13/165,555 Information Disclosure Statement Jan. 11, 2012.

* cited by examiner

METHOD AND APPARATUS FOR MANAGING COMMUNICATIONS IN A WIRELESS COMMUNICATION SYSTEM

TECHNICAL FIELD

The present technology pertains in general to managing communication with wireless devices in wireless communication systems.

BACKGROUND

In addition to voice services, the evolution of wireless communication networks has dramatically increased the availability of data services and their adoption for remote communication between users and machine terminals, for example for data collection and submission from wireless meters and teller machines. This has emphasized certain aspects of traffic management in wireless communication systems that are different from those occurring in traditional voice communications as many applications for machine communication exhibit different real-time communication requirements with different tolerances for communication delays. Some of the terms typically used in the art to refer to communications with machine terminals include machine-terminal communication or machine-type communication (MTC), or machine-to-machine communication (M2M).

Wireless communication networks provide a means for effective access to other data networks for mobile devices and other applications. To realize this, a number of data services have been designed for wireless communication networks that facilitate wireless communication. Wireless data transmission is supported by digital wireless communication systems including GPRS (general packet radio service) and GSM (Global System for Mobile Communication) or UMTS (Universal Mobile Telephone System) and will be part of the LTE (Long Term Evolution) system, for example, which are readily known.

The architecture of wireless communication systems typically provides for hierarchies comprising one or more sub-networks that provide predetermined functions or services or both to predetermined areas. Infrastructure servicing different areas is then interconnected by a corresponding backbone network, which in itself is organized in a hierarchical fashion. A subnetwork generally comprises a number of packet data service nodes connected in such a way that it can provide a packet-switched service for wireless devices via several base stations. The intermediate mobile communication network provides packet-switched data transmission between a support node and wireless devices. Certain subnetworks may be connected to an external data network, for example, to a public switched data or phone network, via predetermined gateway nodes for relaying corresponding services. Wireless communication systems service thus allows packet data transmission between wireless devices and external data networks.

The wireless nature of the communication in wireless communication systems proves useful for applications in mobile wireless devices as well as for convenient interconnection of wireless devices which may not necessarily require full or partial mobility. Aspects of mobility of a growing number of wireless devices for machine communication, for example, may differ significantly from mobile phones traditionally used for human-to-human voice communication.

Wireless communication system design, traditionally, has addressed mobility collectively equally for all wireless devices. For example, aspects of communication management in wireless communication systems may occur substantially instantaneously within the abilities of the wireless communication system without further discriminating between different needs for communications to and/or from different types of wireless devices. For this reason, wireless communication systems may get overloaded and congested. The ability to perform communications in traditional wireless communication systems between all types of wireless devices at any time in an uncoordinated manner may cause a significant amount of network traffic and essentially congest the network.

For example, Technical Specification: "Service requirements for machine-type communications", Stage 1, 3GPP TS 22.368 V1.1.1, addresses the problem of congestion by M2M communication. The document describes aspects of increased network traffic caused by M2M communication, however, it does not teach a solution.

Therefore there is a need for a solution that overcomes at least one of the deficiencies in the art.

This background information is provided to reveal information believed by the applicant to be of possible relevance to the present technology. No admission is necessarily intended, nor should be construed, that any of the preceding information constitutes prior art against the present technology.

SUMMARY OF THE TECHNOLOGY

An object of the present technology is to provide a method and apparatus for managing communications in a wireless communication system. According to an aspect of the present technology there is provided a method for managing communication with a plurality of wireless devices in a wireless communication system, the wireless communication system comprising one or more network sectors, each network sector configured for communicative association with one or more of the plurality of wireless devices, and each network sector associated with a corresponding traffic threshold, the method comprising: evaluating one or more network traffic levels, each network traffic level associated with a respective network sector; and submitting one or more access-configuration messages in one or more network sectors when the evaluated network traffic level of a particular network sector has a predetermined relation to the traffic threshold for that particular network sector; said one or more access-configuration messages for shifting one or more wireless devices into one or more predetermined operational conditions.

According to another aspect of the present technology there is provided an apparatus for managing communication with a plurality of wireless devices in a wireless communication system, the wireless communication system comprising one or more network sectors, each network sector configured for communicative association with one or more of the plurality of wireless devices, and each network sector associated with a corresponding traffic threshold, the apparatus comprising: a user communication interface for receiving information indicating a need to communicate with one or more of the plurality of wireless devices; a wireless communication system interface for establishing an operative coupling to the wireless communication system for receiving information regarding one or more network traffic levels, each network traffic level associated with a respective network sector; and a communication management system for evaluating the one or more network traffic levels, and for submitting one or more access-configuration messages in one or more network sectors when the evaluated network traffic level of a particular network sector has a predetermined relation to the traffic threshold for that particular network sector; said one or more access-configuration messages for shifting one or more wireless devices into one or more predetermined operational conditions.

According to another aspect of the present technology there is provided a wireless device for communication with a wireless communication system, the wireless device comprising: a network interface for establishing an operative connection with the wireless communication system; and a control system operatively coupled to the network interface, the control system configured to control an operational condition of the wireless device, the control system configured to shift the wireless device into a predetermined operational condition upon receipt of an access-configuration message; said access-configuration message for controlling network traffic associated with the wireless device.

According to another aspect of the present technology there is provided a computer program product comprising a memory having computer readable code embodied therein, for execution by a CPU, for performing the method of managing communication with a plurality of wireless devices in a wireless communication system, the wireless communication system comprising one or more network sectors, each network sector configured for communicative association with one or more of the plurality of wireless devices, and each network sector associated with a corresponding traffic threshold, the method comprising: determining a need to communicate with one or more of the plurality of wireless devices; evaluating one or more network traffic levels, each network traffic level associated with a respective network sector; and submitting access-configuration messages in one or more network sectors when the evaluated network traffic level of a particular network sector has a predetermined relation to the traffic threshold for that particular network sector, said one or more access-configuration messages for shifting one or more wireless devices into one or more predetermined operational conditions.

DETAILED DESCRIPTION OF THE TECHNOLOGY

Definitions

Figure 1A:
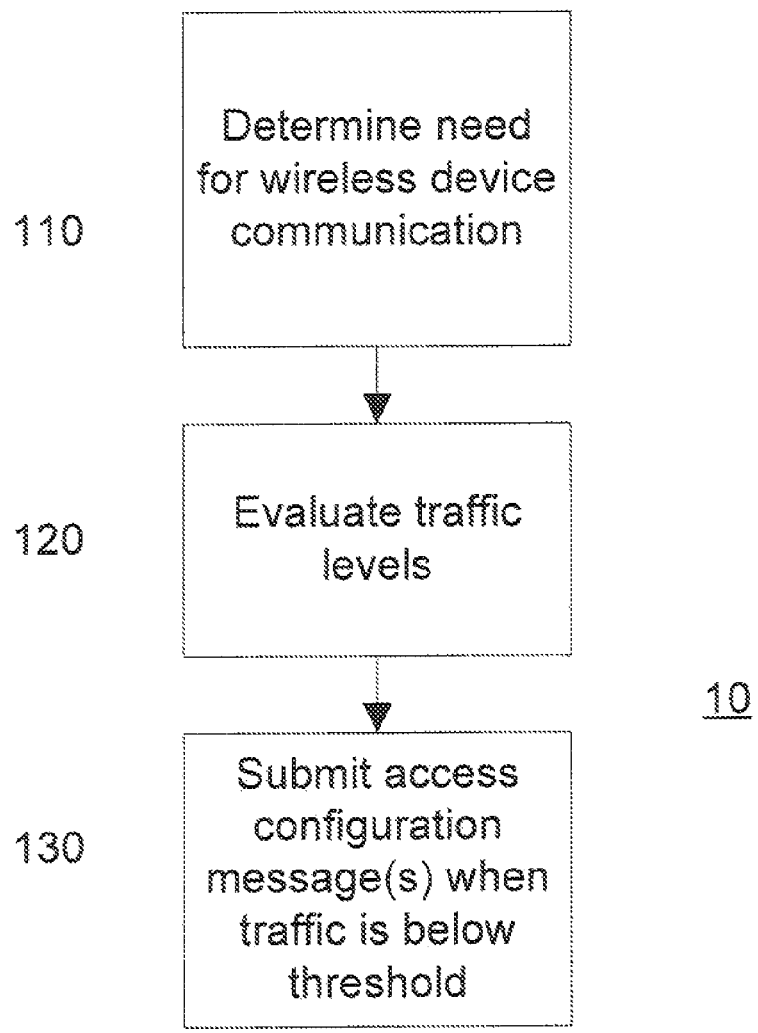
FIG. 1A illustrates a flow diagram of methods of managing communications in a wireless communication system according to some embodiments of the present technology.

The term "wireless device" is used to refer to an apparatus for analog and/or digital transmission and/or reception of signals for communication purposes via electromagnetic radiation propagating, for example, through vacuum, or air, or a generally non-conductive medium to or from another apparatus. The wireless device may use signals formatted according to one or more of a number of communication systems including mobile phone networks such as cellular or satellite phone networks, or other current or future wireless communication systems, for example. A wireless device can comprise or be included in one or more of various forms of handheld/mobile and/or stationary communication, control and/or computing devices such as a meter reader, teller machine, vehicle or goods tracker or theft alarm apparatus, radio, mobile phone, cellular phone, satellite phone, Smartphone, or a personal computer (PC) such as a desktop, notebook, tablet PC, personal digital assistant (PDA), game console, or peripherals such as a printer, camera, pointing device, or other apparatus, for example.

The term "network sector" is used to refer to a portion of a wireless communication system. The term is used in combination with a conceptual portioning of the wireless communication system into parts of a wireless communication system. The portioning may occur at a predetermined level in a hierarchy of a wireless communication system architecture. For example, in a cellular wireless communication system a network sector may refer to portions of the communication system that are associated with a sector of a base transceiver station (BTS or NodeB), a BTS, a radio network controller (RNC), a serving general packet radio service (GPRS) support node (SGSN), a gateway GPRS support node (GGSN), a mobility management entity (MME), a serving gateway (S-GW), packet data network gateway (PDN-GW) or other part of the wireless communication system, for example.

As used herein, the term "about" refers to a +/−10% variation from the nominal value. It is to be understood that such a variation is always included in a given value provided herein, whether or not it is specifically referred to.

Unless defined otherwise, all technical and scientific terms used herein have the same meaning as commonly understood by one of ordinary skill in the art to which this technology belongs.

Certain communications with various types of wireless devices or, in general, various types of communications, for example 1P-based, non-voice or other communications, or communications with M2M/MTC wireless devices, can exhibit characteristics that may be different in a number of ways from other forms of communications and/or types of wireless devices. For example, in contrast to traditional voice communications between users, M2M/MTC communications may involve larger numbers of communicating devices with comparatively little traffic per device. Communications between such wireless devices, which may, without further communications management, cause network traffic congestion and/or overload wireless communication systems. The present technology provides efficient and scalable improvements that may facilitate operation of wireless communication systems with substantially delay-insensitive communications to and/or from large numbers of wireless devices. For this purpose the present technology provides a method, an apparatus, a wireless device and other systems and methodologies for managing communication with a plurality of wireless devices in a wireless communication system.

According to embodiments, access-configuration messages are employed for the mitigation of congestion in wireless communication systems. Access-configuration messages can cause one or more of throttle, delay, stop/interrupt, cancel, initiate at certain times or otherwise control communications with predetermined types of wireless devices during times of predetermined network traffic levels. For example, predetermined traffic levels can be defined as high or low network traffic levels. For example, delaying certain communications can distribute over time the ensuing network traffic to and/or from certain wireless devices and aid in reducing network traffic congestion.

Depending on the embodiment, access-configuration messages can affect certain types of communications with certain types of wireless devices in certain network sectors. Access-configuration messages can delay certain communications until network traffic conditions drop below certain thresholds and may be different and/or associated with different thresholds in different network sectors. Depending on the embodiment, access-configuration messages may be associated with one or more types of communications, one or more wireless devices, and one or more groups of wireless devices or combinations thereof. According to embodiments, communications can be deferred to or initiated at times of low network traffic. When a network traffic level is less than the corresponding threshold, a certain amount of additional communications may be sustained without overloading the wireless communication system within that particular network sector.

Embodiments of the present technology can be employed in managing communication with wireless devices in a wireless communication system comprising one or more network sectors. Depending on the embodiment, each network sector is configured for communicative association with one or more of the wireless devices and associated with a corresponding traffic threshold. The communicative association of a wireless device and a network sector may be determined by one or more of proximity, whether the wireless device is located within a service area associated with a particular network sector or other methodology employed by the wireless communication system. Examples of such networks may include terrestrial or satellite-based cellular or other wireless communication systems.

According to an embodiment, network traffic thresholds may be determined based on how much traffic the wireless communication system can sustain and how much traffic communication with the wireless devices may cause. For example, a traffic threshold may be based on the ratio of traffic per wireless device times the number of wireless devices divided by the maximum traffic load of the wireless communication network, wherein all these characteristics may be per network sector. As such, network traffic thresholds may be employed for different types of network traffic and/or one or more wireless devices.

According to some embodiments of the present technology, if there is a need to communicate with one or more wireless devices, network traffic levels will be determined in one or more network sectors. For example, a need to communicate can include one or more of if a user requests readings from predetermined wireless devices used to acquire data from electricity meters or if a user needs to control the meters, or other information is communicated to and/or from other M2M/MTC devices, or some other need arises that requires contacting one or more predetermined wireless devices.

According to some embodiments, one or more access-configuration messages will be submitted in one or more network sectors when the evaluated network traffic level of a particular network sector is less than the traffic threshold for that particular network sector. According to some embodiments, access-configuration messages that aim for a reduction of network traffic may be submitted during times of high network traffic. The access-configuration messages are configured to initiate communication with the predetermined wireless devices. In order to perform the noted actions, embodiments of the present technology provide a communication management apparatus and adequately configured wireless devices.

FIG. 1A illustrates a flow diagram 10 of a method according to some embodiments of the present technology. As illustrated, step 110 includes determining a need to communicate with one or more wireless devices, wherein the communication may include one or more transmissions to and/or from the wireless devices. Step 120 includes evaluating one or more network traffic levels, wherein each network traffic level is associated with a respective network sector. Step 130 includes submitting access-configuration messages in one or more network sectors when the evaluated network traffic level of a particular network sector is less than the traffic threshold for that particular network sector.

Figure 1B:
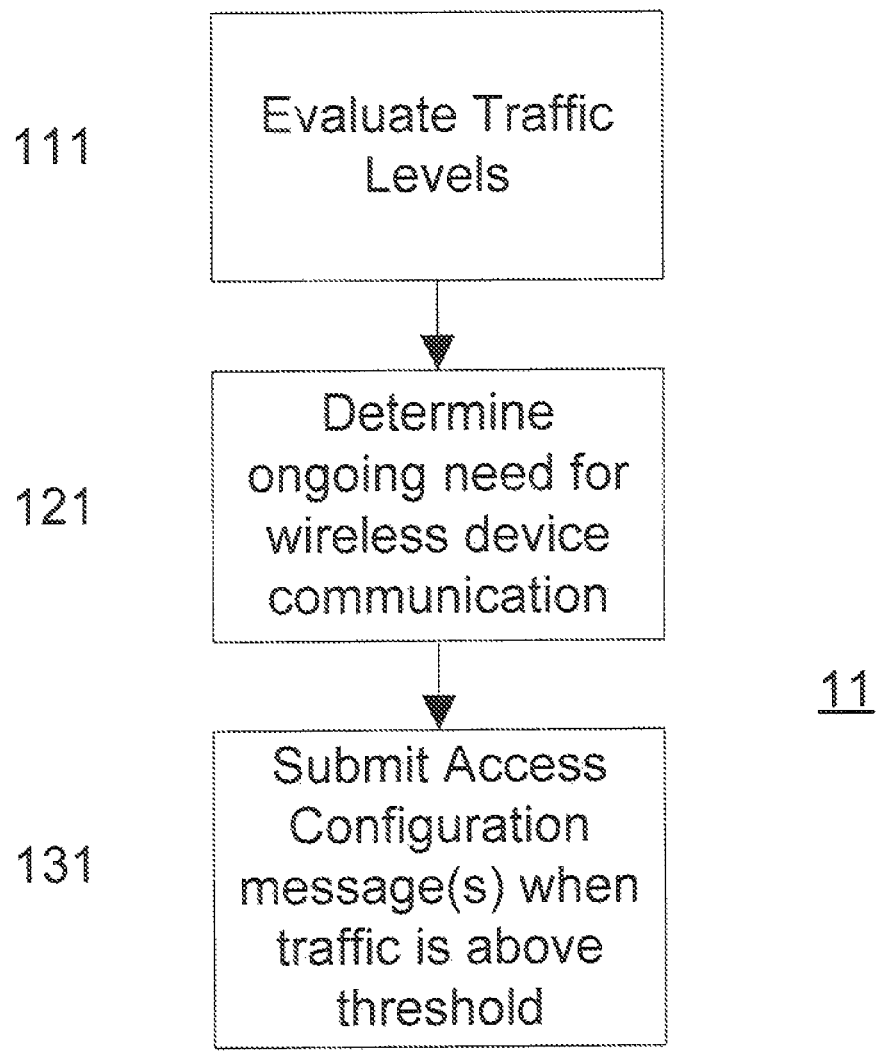
FIG. 1B illustrates a flow diagram of methods of managing communications in a wireless communication system according to some embodiments of the present technology.

FIG. 1B illustrates a flow diagram 11 of a method according to some embodiments. As illustrated, step 111 includes evaluating one or more network traffic levels, wherein each network traffic level is associated with a respective network sector. Step 121 includes determining a need to continue communication with one or more of the plurality of wireless devices and the possible need for the wireless devices to communicate based on their own needs. Step 131 includes submitting access configuration messages in one or more network sectors when the evaluated network traffic level(s) of a particular network sector is/are greater than the traffic threshold for that particular network sector, said access-configuration messages configured to throttle, delay or cancel communication with the one or more of the plurality of wireless devices or to restrict one or more of the plurality of wireless devices communication through throttling, delay or cancellation.

Depending on the embodiment, access-configuration messages may be configured to submit instructions to wireless devices that may determine if, how and/or when a wireless device may or must change its operational condition and/or communicate with the wireless communication system. Wireless devices according to embodiments, may accordingly be configured to passively process received instructions, or commence a communication with the wireless communication system, for example.

Access-Configuration Messages

According to embodiments, access-configuration messages may be configured to submit instructions to wireless devices that may determine if, how and/or when a wireless device may or must change its operational condition and/or communicate with the wireless communication system. Depending on the embodiment, an access-configuration message may be configured to instruct a wireless device to change an operational condition or to invoke one or more predetermined actions in a wireless device or cause one or more other actions in a wireless device, for example. Depending on the embodiment, an access-configuration message may be used as a wake-up, idle, throttle, interrupt, cancel or other message for causing a corresponding action in a wireless device.

According to embodiments, access-configuration messages may be submitted in one or more network sectors. They may be broadcast, multicast or otherwise disseminated at the same or at different times, even when they originate for the same reason or need. According to embodiments, submission of access-configuration messages at different times can be intentional or caused by delays originating from corresponding network sectors carrying traffic beyond the corresponding traffic threshold, or both.

According to some embodiments, different access-configuration messages may be associated with different priorities for execution by a wireless device. According to an embodiment, access-configuration messages include information indicating a priority that can be used by adequately configured wireless devices and/or wireless communication systems to determine how, for example in what order, to respond, process and/or forward different access-configuration messages.

According to an embodiment, access-configuration messages can include predetermined identifiers, which can be used to address one or more particular wireless devices. For example, one particular identifier may indicate that a corresponding access-configuration message is addressed for wireless devices employed to control electricity meters operated by Company A, another identifier may indicate that a corresponding access-configuration message is addressed for automatic teller machines operated by Bank B or other service provider and so forth.

In accordance with an aspect of the present technology, a communication management apparatus and associated wireless devices are configured to assure needed communications take place within corresponding predetermined times. For example, access-configuration messages may need to be broadcast within a maximum predetermined time or at minimum predetermined frequencies upon determination of a need to communicate with corresponding wireless terminals.

Access-configuration messages according to embodiments of the present technology may be broadcast within one or more network sectors. An access-configuration message is intended to be processed upon receipt by wireless devices and may cause a change in operational condition(s) of one or more of the wireless devices. A wireless device will process received access-configuration messages to determine if the received access-configuration message is addressed to it. A received access-configuration message may enable or force a change in an operational condition of a wireless device. A wireless device may process an access-configuration message when the wireless device is in an adequate operational condition that allows it to monitor the broadcast channels used to carry the access-configuration messages. An access-configuration message may offer or force a change of operational condition of the wireless device. According to an aspect of the present technology, access-configuration messages may be used to enable putting one or more wireless devices into and out of power-conserving idle, sleep or low power-consumption, disconnected, radio-power off, device-power off or other operational conditions associated with restricted communication capabilities, for example, little, minimal or otherwise characterized communication capabilities, of the corresponding wireless devices. The idle, sleep or low-power operational conditions may aid in preserving power in wireless devices and hence provide corresponding effects and benefits for predetermined applications of corresponding wireless devices.

An access-configuration message may include a wireless device identification (ID), for example, an address or digits of particular significance of an address, or other characterization, associated with one or more specific wireless devices to identify same in access-configuration messages. According to some embodiments, an access-configuration message may include one or more wireless IDs. Access-configuration messages may solicit a wake-up, bar, restrict or otherwise instruct and/or affect the wireless devices associated with the ID(s) included in the access-configuration message. The identification may be a group, owner, operator, utility or other ID, or a shared address or digits of predetermined significance of an ID or address, for example. According to an embodiment, the access-configuration message may be configured as page requests, short messages, or otherwise configured and may be associated with a physical, data link, network, transport, session layer or higher interconnection reference model layer. These and other interconnection reference model layers are readily known in the art.

According to an embodiment, an access-configuration message may include data indicating or referring to a delay and/or response time period, which may be used by one or more wireless devices to enable further functionality. For example, the delay may indicate by how much time one or more wireless devices may or shall delay submission of a response, or the response time period may indicate within a range when one or more wireless devices need to submit a response to a received access-configuration message. The data may be used to determine a delay and/or response time period based on various different methods and in various different ways. For example, the data may directly correspond to the delay and/or response time period or it may be further processed by the wireless device to determine a delay and/or response time period. Further processing may be performed to randomize/distribute over time corresponding actions set by the wireless device. Depending on the embodiment, a delay and/or response time period may refer to an infinite period of time, finite number of predetermined time units, non-zero or zero period of time. Predetermined time units may include microseconds, milliseconds, seconds, minutes, hours, days, or other fractions of time. Depending on the embodiment, delays and/or response time periods, if any, as described herein, may have to be determined in compliance with assured response times to return the information associated with the need to communicate with the wireless devices.

According to an embodiment, an access-configuration message may include information that indicates to repeat submitting responses of a wireless device to the access-configuration message for a predetermined number of times or a predetermined period of time, for example. Corresponding access-configuration messages may be employed to mitigate signalling overhead and/or non-payload communications in the wireless communication system, for example, by subsequent and/or similar access-configuration messages to the same particular wireless devices. The number of repeats or time to repeat may be infinite.

According to another embodiment, an access-configuration message may include information that assigns a maximum uplink, downlink, data volume or communication time and/or other limiting parameters to corresponding wireless devices. Depending on the embodiment, such information may be used to restrict the amount of time and/or data a wireless device may use to communicate with a communication management apparatus between occurrence of predetermined events, for example during a predetermined period of time, during an access period assigned by the access-configuration message, beyond an access period, until receipt of another access-configuration message, or as otherwise assigned by the access-configuration message. According to an embodiment, access-configuration messages may be configured to specify per predetermined time period, during an access period and/or beyond an access period or other restrictions separately. Corresponding access-configuration messages may be used to mitigate network traffic congestion.

According to embodiments, an access-configuration message may include one or more instructions that instruct the wireless devices to which the access-configuration message is addressed to perform one or more particular actions. The instructions may indicate if, how and/or when a corresponding wireless device is to shift into a predetermined operational condition. As such it may be required, permitted, prohibited or otherwise instructed to initiate communications and/or otherwise communicate with the wireless communication system. Depending on the embodiment, a wireless device, upon receipt of an access-configuration message, may or may not initiate communications with the wireless communication system. For example, a wireless device may determine if a need for a corresponding communication exists based upon factors in addition to the receipt of the access-configuration message or upon receipt of the access-configuration message alone. A wireless device according to some embodiments of the present technology may initiate communications based upon an access-configuration message that indicates a mere request and/or invitation, or may initiate communications with the wireless communication system if the access-configuration message indicates one or more corresponding instructions.

According to an embodiment, an access-configuration message may indicate whether addressed wireless devices must initiate communications or whether they are, permitted to initiate communications. If an access-configuration message indicates permission, the access-configuration message may or may not result in communications. For example, if the access configuration message indicates permission, the wireless device determines the need for communication and only initiates communications if it determines a need to do so; if the access configuration message indicates it must communicate, corresponding wireless devices must initiate communications.

Communication Management Apparatus

According to an aspect of the present technology a communication management apparatus is used for managing communication with a plurality of wireless devices in a wireless communication system. According to an embodiment, payload communications between wireless devices and a user may be routed through the communication management apparatus. For example, communications between a user and/or operator and a wireless device may be possible only via a communication management apparatus or through additional other ways.

According to an embodiment, the communication management apparatus comprises a user communication interface for receiving information indicating a need to communicate with one or more of the plurality of wireless devices. The apparatus further comprises a network interface for establishing an operative coupling to the wireless communication system for receiving information regarding one or more network traffic levels. Each network traffic level is associated with a respective network sector. The apparatus further comprises a communication management system for evaluating network traffic levels, and for submitting signals via the network interface to the wireless communication system for initiating submission of access-configuration messages in one or more network sectors when the evaluated network traffic level of a particular network sector is less than the traffic threshold for that particular network sector. The access-configuration messages are configured to wake-up predetermined wireless devices from an idle-operational condition and are configured to initiate communication with corresponding wireless devices.

According to an embodiment, the communication management apparatus is configured to determine the traffic thresholds based on information available about how much traffic the wireless communication system can sustain and how much traffic can be estimated to ensue from communication with the wireless devices. For example, the communication management apparatus may determine traffic thresholds based on the ratio of traffic per network sector per wireless device times the number of wireless devices divided by the maximum traffic load of the wireless communication network.

A communication management apparatus may be configured as an integral part of a wireless communication system, which may be referred to as an internal machine terminal communication apparatus (iMTC). Corresponding integration levels between the communication management apparatus and the wireless communication system may facilitate determination of traffic levels in network sectors, communication with nodes, servers, gateways and other components of the wireless communication system by the communication management apparatus. According to an embodiment, the communication management apparatus may comprise one or more computer-based servers operatively interconnected with each other and with predetermined components of the wireless communication system. Communication management apparatus with two or more computer-based servers may comprise geographically separated computer-based servers. According to another embodiment, a communication management apparatus may be configured as a distributed hardware/software/firmware system and can be provided by predetermined hardware components of a wireless communication system that may be operated in combination with distributed software and/or firmware programs.

Figure 2:
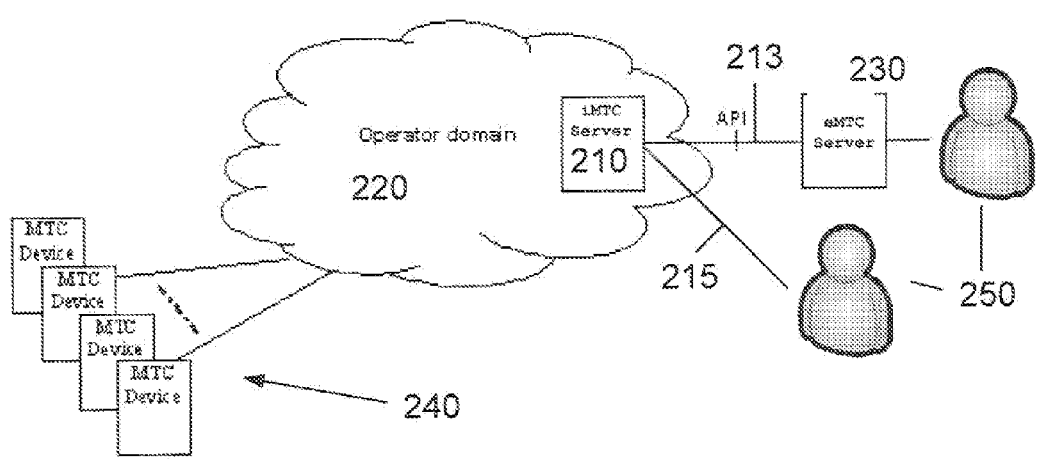
FIG. 2 illustrates an architecture diagram of an example wireless communication system according to some embodiments of the present technology.

FIG. 2 illustrates a schematic diagram of an example architecture of a wireless communication system according to some embodiments. The example wireless communication system includes an iMTC server 210 associated with an operator domain 220, an eMTC server 230 and MTC devices 240. The iMTC server 210 and/or the eMTC server 230 may be operated by a user 250. For example, a user may interact with an eMTC server 230 to interact with an iMTC server 210 to obtain desired information. The interaction may comprise remote control of particular functions of the iMTC server 210 by a user via a user interface (not illustrated) provided by the eMTC server 230. Accordingly, the iMTC server 210 and the eMTC server 230 are configured to provide an application programming interface. It is noted that the operator domain 220 refers to the parts and components of the illustrated example wireless communication system that are provided by one or more particular network operators. It is further noted that components other than the iMTC server 210 may be considered part of the operator domain 220.

Figure 3:
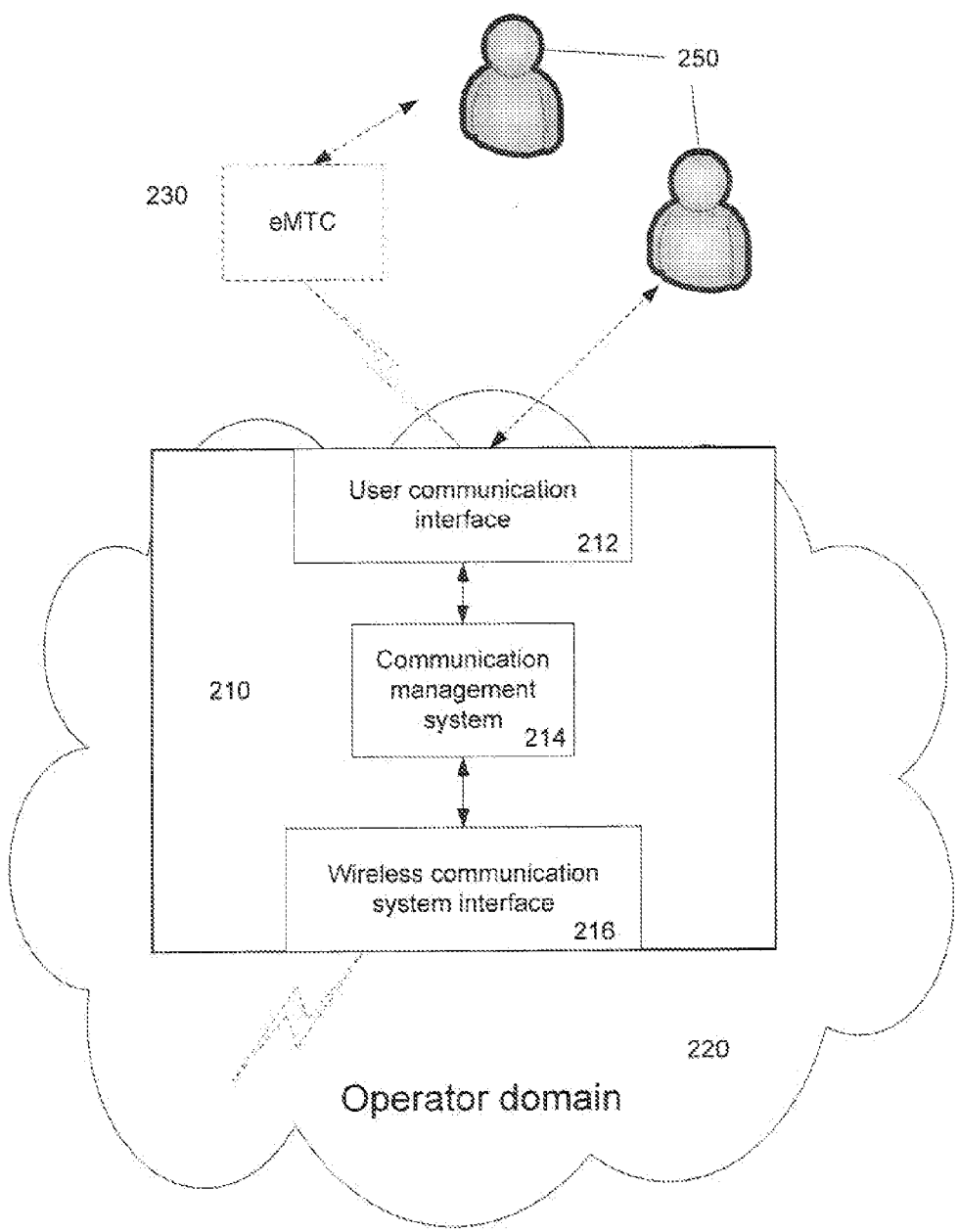
FIG. 3 illustrates a block diagram of an apparatus for managing communications in a wireless communication system according to some embodiments of the present technology.

FIG. 3 illustrates a block diagram of a communication management apparatus configured as an iMTC 210 and certain components of a wireless communication system according to embodiments of the present technology. The iMTC 210 comprises a user communication interface 212, a communication management system 214 and a wireless communication system interface 216. The user communication interface is configured for communication with users 250 or an eMTC server 230, for example, and is further operatively connected to the communication management system 214. The communication management system 214 is further operatively coupled to the wireless communication system interface 216. The iMTC 210 is operatively linked to an operator domain 220.

Wireless devices under the control of a communication management apparatus may be associated into groups by a particular purpose, function, wireless device operator, other entity, and/or other aspect for example. Corresponding wireless devices and/or communication management apparatus may be preconfigured with respective associations or configured via an appropriate user-communication interface.

According to some embodiments, a communication management apparatus may be configured to provide predetermined statistical information on the status and other information of certain groups of wireless devices, for example, upon request, by pulling the information from the apparatus, or automatically, by having the apparatus push/provide the information, at predetermined times or with predetermined frequency or otherwise. Data for the statistical information may be acquired from the wireless devices in a similar manner upon request (pull) or automatically (push) at predetermined times, with predetermined frequency or otherwise, for example. Moreover, an iMTC server may report status to an eMTC server by push or pull methods. According to some embodiments, a communication management apparatus and/or associated wireless devices may be configured to acquire and/or report statistical information regarding each corresponding wireless device in response to receipt of an access-configuration message.

According to an embodiment, the delay and or the response time period is determined by the wireless device in a deterministic pseudorandom manner that can be replicated outside of the wireless device. The deterministic pseudorandom delay and/or response time may be replicated outside of the wireless device and used to verify when a wireless device may access the network. According to an embodiment, a communication management apparatus may be configured to validate that a wireless device is only accessing the wireless communication system during an intended time period, for example, by determining the delay and response time associated with one or more particular wireless devices and by monitoring the communications ensuing from those particular wireless device(s) against the determined delay and response time.

A deterministic pseudorandom delay and/or response time may be determined based on a predetermined method in combination with a unique wireless device identification as described herein, and information regarding the delay and/or response time period of the corresponding access-configuration message. According to an embodiment, an access-configuration message may be configured to include information that may be used as a seed value/parameter in a method used to determine a pseudorandom delay and/or response time, for example. According to an embodiment, the seed value may be determined by the communication management apparatus to equilibrate traffic ensuing from wireless devices that correspond with a particular access-configuration message. According to an embodiment, a communication management apparatus may be configured to engage in a predetermined manner with wireless devices that do not adhere to limit communication to assigned times.

According to an embodiment, a communication management apparatus may be configured to generate or initiate generation of an access-configuration message that may include information that indicates to a wireless device to repeat submitting responses to the access-configuration message for a predetermined number of times or a predetermined period of time, for example. This may be employed to reduce signalling overhead and/or non-payload communications in the wireless communication system, for example, by subsequent and/or similar access-configuration messages to the same particular wireless devices. The number of repeats or time to repeat may be infinite.

According to an embodiment, a communication management apparatus may be configured to generate or initiate generation of an access-configuration message that includes information that assigns a maximum uplink, downlink, data volume or communication time and/or other limiting parameters to corresponding wireless devices. Depending on the embodiment, such information may be used to restrict the amount of time and/or data a wireless device may use to communicate with the communication management apparatus between and/or until occurrence of one or more predetermined events, for example during a predetermined period of time, during an access period assigned by the access-configuration message, beyond an access period, until receipt of another access-configuration message, or as otherwise assigned by the access-configuration message. According to an embodiment, a communication management apparatus may be configured to generate or initiate generation of access-configuration messages that are configured to specify per predetermined time period, during an access period and/or beyond an access period or other restrictions separately. Corresponding access-configuration messages may be used by the communication management apparatus to mitigate network traffic congestion.

User Communication Interface

Depending on the embodiment, the user-communication interface may be configured in different ways. For example, and as illustrated in FIG. 2, the user-communication interface may be configured as a user interface 215 for interactive communication with a user and operated on the communication management apparatus. According to another embodiment, the user-communication interface may be configured as an application programming interface 213. The application programming interface may be configured so it is accessible via a predetermined network protocol and accordingly may be accessed via an apparatus that is external to the communication management apparatus, for example, an external machine terminal communication apparatus (eMTC). The eMTC may be configured to provide a user interface for enabling interaction between a user and predetermined wireless devices. A user-communication interface may operatively interconnect an iMTC 210 with more than one (not illustrated) eMTC 230.

Wireless Communication System Interface

The wireless communication system interface of the communication management apparatus is configured for operatively connecting the communication management apparatus with the wireless communication system. Depending on the embodiment, the wireless communication system interface can operatively interconnect the apparatus for managing communication with different components of the wireless communication system via one or more interfaces. For example, the wireless communication system interface may be connected with an uplink or downlink or the uplink and the downlink of an RNC. The specific type of interconnection may depend on how many and at what particular level the communication management system is configured to manage communication. The wireless communication system interface may employ wireless or wired, X.25, SONET, ATM or other interconnect systems, for example.

Communication Management System

The communication management system is configured to evaluate network traffic levels in network sectors. Depending on the embodiment, the communication-management system may perform an evaluation for determining network congestion and/or overload on an ongoing basis or upon occurrence of certain events, for example, when wireless devices need to be contacted. Depending on the embodiment, the communication management system may be configured to manage communication with one or more wireless devices and/or one or more groups of wireless devices within the wireless communication system. For example, the communication management system may be configured to manage communication with wireless devices that are at least in part able to carry delay tolerant communications, with M2M/MTC wireless devices, or with wireless devices associated with a particular purpose, function, operator or other entity, for example.

According to an embodiment, the communication management system is configured to evaluate network traffic levels of one or more particular network sectors and determine if one or more network traffic levels are less and/or more than the traffic thresholds for the particular network sectors and then submit signals via the network interface to the wireless communication system. The communication management system causes the submission of access-configuration messages in one or more of the network sectors when the evaluated network traffic level of a particular network sector is less than the traffic threshold for that particular network sector.

According to an embodiment, the communication management system may communicate with BTSs of a wireless communication system to evaluate network traffic levels on a BTS or BTS sector level, for example, and instruct BTSs to broadcast access-configuration messages when network traffic levels fall below or raise above corresponding traffic thresholds. According to other embodiments, the communication management system may communicate with an RNC, SGSN, GGSN, MME, SGW, PGW or other components of the wireless communication system for evaluation of network traffic levels and/or submission of access-configuration messages.

Depending on the embodiment, the submission of access-configuration messages over wireless links may be caused in effect of the communication management system directly instructing other components that can submit access-configuration messages within a particular network sector of the wireless communication system to generate the access-configuration messages; or the communication management system may instruct the other components of the wireless communication system to monitor network traffic levels autonomously and generate the access-configuration messages when the evaluated network traffic level of the corresponding network sector is less than the traffic threshold for that particular network sector.

As noted herein, the communication management apparatus may be configured as an integral part of a wireless communication system referred to as an iMTC. Corresponding integration levels between the communication management apparatus and the wireless communication system therefore can facilitate determination of traffic levels in network sectors, communication with nodes, servers, gateways and other components of the wireless communication system for the communication management system. Accordingly, the communication management system may be part of or comprise one or more computer-based servers operatively interconnected with each other and with predetermined components of the wireless communication system. Communication management systems with two or more computer-based servers may be configured to operate as distributed systems on different computer systems that may be geographically separate.

According to an embodiment, a communication management system may be configured as a distributed hardware/software firmware system and be provided by predetermined hardware and/or firmware components of a wireless communication system that may be operated in combination with distributed software and/or firmware programs.

Wireless Device

Figure 4:
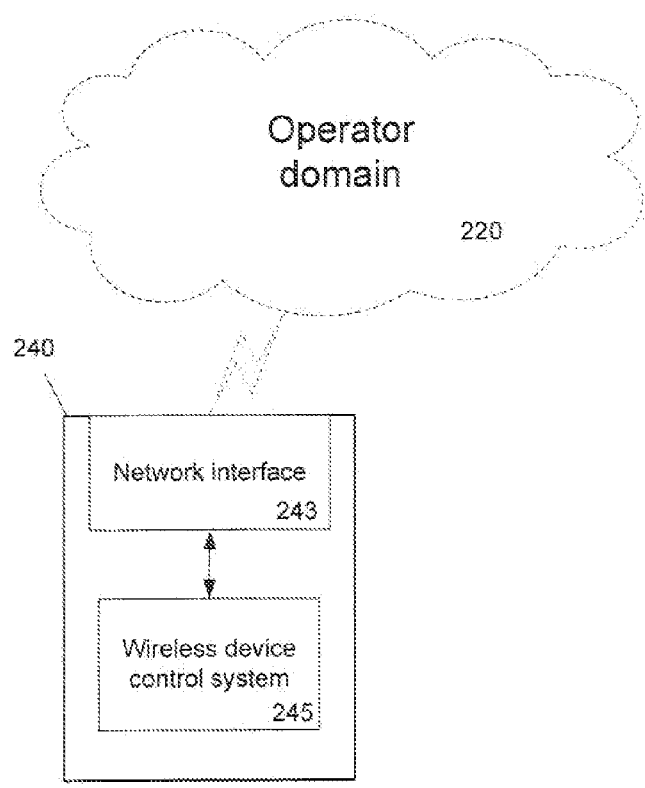
FIG. 4 illustrates a block diagram of a wireless device for managing communications in a wireless system according to some embodiments of the present technology.

A wireless device according to embodiments of the present technology is configured to communicate with a wireless communication system. FIG. 4 illustrates a wireless device 240 according to some embodiments that can be operatively connected to an operator domain 220. The wireless device 240 comprises a network interface 243 and a control system 245. The network interface 243 is provided to establish an operative connection with the wireless communication system. The control system 245 is provided for controlling when an operative coupling of the wireless device 240 to the network interface 243 is established, what operational condition the wireless device is shifted to and to perform predetermined other functions required for operating the wireless device 240.

According to an embodiment, payload communications between wireless devices and a user may be routed through a communication management apparatus. For example, communications between a user and/or operator and a wireless device may be possible only via a communication management apparatus or through additional other ways.

According to an embodiment, the wireless device is configured to be able to receive and process access-configuration messages and to control its operational condition based on information provided by the received access-configuration message. For example, a wireless device may be configured to shift from an idle operational condition to an active operational condition upon receipt of one or more access-configuration messages if so indicted in the access-configuration message. A wireless device may be used to control functions of a utility meter reader, a teller machine, a vehicle surveillance device, a device for remote control of machinery or other apparatus, for example.

According to an embodiment, the wireless device is configured to shift into an idle operational condition upon the passing of a predetermined period of time of predetermined inactivity and/or the occurrence of a predetermined event such as the completion of a transmission or other event, for example. Depending on the embodiment, the wireless device may be configured to resume and/or switch to an idle and/or active operational condition at predetermined frequency and/or after predetermined periods of time. An idle operational condition may be characterized by inactivity of certain components of the wireless device, for example, an inactive wireless radio. An idle operational condition is further characterized by the wireless device at least being able to receive access-configuration messages and process them as described herein.

According to an embodiment, the wireless device is configured to engage in one or more predetermined communications via the wireless communication system depending on the operational condition of the wireless device. The wireless device may be configured to perform certain functions and/or communications associated with an active operational condition but not in an idle operational condition. According to an embodiment, the wireless device is configured to activate a wireless radio of the wireless device upon switching to the active operational condition and/or maintain the wireless radio active throughout the active operational condition. It is noted that predetermined components of the wireless device may be inactive during an active operational condition.

According to an embodiment, an active and/or idle operational condition may include one or more levels of operational associations of the wireless device with the wireless communication system. For example in an idle operational condition, a wireless device may have performed one or more types of communications with the wireless communication system in anticipation of a transmission of payload data but not yet have transmitted the payload data. Corresponding associations of the wireless device with the wireless communication system may, subsequently, enable a faster response and cause less network traffic to following access-configuration messages. Operational associations may include attachments of the wireless device to the wireless communication system and/or activation of one or more contexts of communication between the wireless device and the wireless communication system.

Depending on the embodiment, a wireless device may be configured to submit a delayed response to or a response within a particular period of time from an access-configuration message depending on data included in the access-configuration message and/or data stored in the wireless device, as well as in accordance with a predetermined configuration of the wireless device. A wireless device may accordingly back-off from responding to an access-configuration message for a certain time.

According to an embodiment, a wireless device is configured to respond to an access-configuration message within a portion of the delay indicated by the delay data included in an access-configuration message. Depending on the embodiment, the wireless device may determine the portion by generating a random number which may range from zero to the delay time indicated in the access-configuration message, or by dividing the portion by a random or predetermined divider. Depending on the embodiment, a wireless device may be configured to process a divider of zero in one or more special ways, for example a zero divider may cause the wireless device to respond to the access-configuration message immediately or to wait until receipt of a predetermined number of subsequent access-configuration messages and then respond immediately. Depending on the embodiment, the divider may be provided via an access-configuration message or the wireless device may be preconfigured with it, for example. According to an embodiment, wireless devices may be configured with different dividers in order to attempt spreading communication traffic, for example, predetermined groups of wireless devices may be associated with different dividers. Different dividers may consequently be used to assign different communication priorities to different groups of wireless devices.

According to an embodiment, a wireless device is configured to determine a delay and/or response time period based on corresponding information included in an access-configuration message addressed for the wireless device. For example, the delay may indicate by how much time a wireless device may delay a response to a received access-configuration message. The data may be used to determine a delay based on various different methods and in various different ways. For example, the data may directly correspond to the delay or it may be further processed by the wireless device to determine a delay.

According to an embodiment, the delay and or the response time period may be determined by the wireless device in a deterministic pseudorandom manner that can be replicated outside of the wireless device. The deterministic pseudorandom delay and/or response time may be used to verify if a wireless device is accessing the network as intended. For example, a pseudorandom deterministically determined delay and/or response time period may be used by the wireless communication system to validate that the wireless device is only accessing the wireless communication system during an intended time period, for example.

The wireless device may, determine a deterministic pseudorandom delay and/or response time based on a predetermined method in combination with a unique wireless device identification as described herein, and information regarding the delay and/or response time period of a corresponding access-configuration message. According to an embodiment, the wireless device may utilize a seed value/parameter, if any, as described herein, included in an access-configuration message to determine a pseudorandom delay and/or response time. According to an embodiment, the seed value may be determined by the communication management apparatus to equilibrate traffic ensuing from wireless devices that correspond with a particular access-configuration message. According to an embodiment, a wireless device may be configured to respond in a predetermined manner to communications from a communication management apparatus in response to failure to adhere to limit communication to assigned times.

Figure 5:
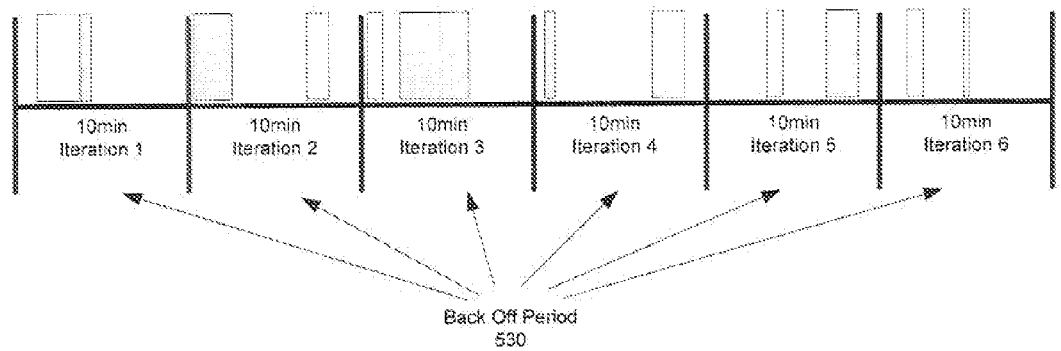
FIG. 5 illustrates an example of repeat communications ensuing from two wireless devices upon receipt of a corresponding access-configuration message, in accordance with some embodiments of the present technology.

According to an embodiment, a wireless device may be configured to repeat particular communications for a particular number of times or a particular period of time as indicated by a correspondingly configured access configuration message in response to receipt of the access configuration message by the wireless device. The number of repeats or time to repeat may be infinite MTC, in which case a correspondingly configured wireless device repeats responding until instructed otherwise by another access-configuration message. Wireless devices that respond to a single access-configuration message repeatedly may be employed to reduce signalling overhead and/or non-payload communications to and/or from the wireless device, for example, by subsequent and/or similar access-configuration messages to the same particular wireless devices. FIG. 5 illustrates an example of repeat communications ensuing from two wireless devices 510 and 520 configured to respond to a corresponding access-configuration message. For example and as illustrated, the wireless devices 510 and 520 are configured to respond upon receipt of a corresponding access-configuration message to report status every ten minutes for one hour. During each ten minute back off period 530, each wireless device 510 or 520 determines its communication times based on the information included in the access-configuration message, and commences communication with the wireless communication system during the corresponding communication times repeatedly.

According to an embodiment, a wireless device may be configured to respond to an access-configuration message that includes information that assigns a maximum uplink, downlink, data volume or communication time and/or other limiting parameters to one or more corresponding wireless devices. Depending on the embodiment, such information may be used by the wireless device to restrict the amount of time and/or data the wireless device uses to communicate between and/or until occurrence of one or more predetermined events, for example during a predetermined period of time, during an access period assigned by the access-configuration message, beyond an access period, until receipt of another access-configuration message, or as otherwise assigned by the access-configuration message. According to an embodiment, a wireless device may be configured to respond to access-configuration messages that include respective limiting parameters per predetermined time period, for example two hours, during an access period and/or beyond an access period or other restrictions separately. Correspondingly configured wireless devices may be used to mitigate network traffic congestion.

According to an embodiment, a wireless device may be configured to respond to an access-configuration message until another access-configuration message has been received by the wireless device or until a predetermined time or delay indicated in the access-configuration message has/have passed, for example. Depending on the embodiment, the wireless device may be configured to respond to a first wake-up call immediately or as indicated by a delay period but not respond to a predetermined number of subsequent access-configuration messages or until a predetermined time has passed.

Upon receipt of an access-configuration message, a wireless device may perform a number of predetermined actions. For example, the wireless device may attach to the wireless communication system, activate a context, perform mobile management, report status information to an iMTC server and/or communicate directly with an eMTC server, and/or perform other actions. Depending on the communication-delay tolerance of wireless devices and needed applications and/or functions, connectivity gaps with a corresponding eMTC server and/or MTC user, for example, may be feasible. Wireless devices may initiate and/or perform parts or all of an operation associated with one or more access-configuration messages depending on priority. For example, a wireless device may delay responding to access-configuration messages depending on priority of communications.

Network Interface

The network interface of a wireless device is configured for operatively connecting the wireless device with the wireless communication system. Depending on the embodiment, the wireless communication system interface can operatively interconnect the wireless device with one or more components of the wireless communication system via one or more wireless interfaces and one or more communication protocols and wireless interconnect systems. For example, the network interface may be connected with an uplink or downlink or both uplink and downlink of a BST/NodeB. The wireless communication system interface may include GPRS, UMTS, EVDO, or other wired or wireless interconnect systems.

Control System of Wireless Device

The control system is operatively coupled to the network interface for processing data and controlling communication and functions of the wireless device. The control system is configured to shift the wireless device between operational conditions depending upon the occurrence of predetermined events. The control system is configured to shift the wireless device from an idle operational condition to an active operational condition based upon receipt of one or more access-configuration messages as described herein. As described herein, access-configuration messages may be used to enable putting wireless devices into power-conserving idle, sleep or low power-consumption operational conditions associated with restricted communication capabilities, for example, minimal communication capabilities, of the corresponding wireless devices. The idle, sleep or low-power operational conditions may aid in preserving power in wireless devices and hence provide corresponding effects and benefits for predetermined applications of corresponding wireless devices and the wireless device may be shifted into an idle, sleep, or low-power operational mode in correspondence with occurrence of predetermined events.

According to an embodiment, the control system is configured to respond upon the earlier of receipt of a predetermined access-configuration message or the expiry of a previously initiated delay even if no new access-configuration message has been received subject to no or predetermined restrictions imposed externally, for example, via iMTC/eMTC servers to prevent the device from excessive communications. This enables configuring the wireless device with reporting intervals independent of constraints otherwise imposed by access-configuration message intervals.

It will be appreciated that, although specific embodiments have been described herein for purposes of illustration, various modifications may be made without departing from the spirit and scope of the invention. In particular, it is within the scope of the invention to provide a computer program product or program element, or a program storage or memory device such as a transmission medium, magnetic or optical wire, tape or disc, or the like, for storing signals readable by a machine, for controlling the operation of a computer according to the method of the invention and/or to structure its components in accordance with the system of the invention.

Further, each step of the methods may be executed on a general computer, such as a personal computer, server or the like and pursuant to one or more, or a part of one or more, program elements, modules or objects generated from any programming language, such as C, C++, Java, Perl, PL/1, or the like. In addition, each step, or a file or object or the like implementing each said step, may be executed by special purpose hardware or a circuit module designed for that purpose.

It is obvious that the foregoing embodiments of the present technology are examples and can be varied in many ways. Such present or future variations are not to be regarded as a departure from the spirit and scope of the invention, and all such modifications as would be obvious to one skilled in the art are intended to be included within the scope of the following claims.

We claim:

1. A method for managing communication with a plurality of delay-tolerant wireless devices in a wireless communication system, said plurality of delay-tolerant wireless devices being a subgroup of wireless devices in the wireless communication system, the wireless communication system comprising a plurality of network sectors, each network sector configured for communicative association with one or more of the plurality of delay-tolerant wireless devices, and each network sector associated with a corresponding traffic threshold, the method comprising:
   a. evaluating one or more network traffic levels, each network traffic level associated with a respective network sector; and
   b. submitting one or more access-configuration messages in one or more network sectors when the evaluated network traffic level of a particular network sector is below the traffic threshold for that particular network sector; said one or more access-configuration messages for shifting one or more of the plurality of delay-tolerant wireless devices from an idle operational condition to an active operational condition, wherein each of the plurality of delay-tolerant wireless devices is configured, subsequent to shifting to the active operational condition, to perform a predetermined action and autonomously return to the idle operational condition.

2. The method according to claim 1 further comprising determining a need to communicate with one or more of the plurality of delay-tolerant wireless devices and performing step a) thereafter.

3. The method according to claim 1, wherein one or more of the access-configuration messages are configured to initiate communication with one or more of the plurality of delay-tolerant wireless devices.

4. The method according to claim 1, wherein the predetermined action comprises transmitting responses from each of the plurality of delay-tolerant wireless devices over the wireless communication system.

5. The method according to claim 4, wherein the one or more access configuration messages include delay data, and wherein the plurality of delay-tolerant wireless devices are configured to randomly delay transmission of said responses by a delay time dependent on said delay data.

6. The method according to claim 5, wherein the delay data is configured so as to distribute aggregate traffic from the plurality of delay-tolerant wireless devices due to said responses over time so as to limit peak traffic levels.

7. The method according to claim 4, wherein the traffic threshold for a network sector is based at least in part on an expected impact on total network traffic in at least one network sector due to transmission of said responses.

8. The method according to claim 1, wherein the plurality of delay-tolerant wireless devices are managed under the control of a communication management apparatus coupled to each of the plurality of network sectors.

9. An apparatus for managing communication with a plurality of delay-tolerant wireless devices in a wireless communication system, said plurality of delay-tolerant devices being a subgroup of wireless devices in the wireless communication system, the wireless communication system comprising a plurality of network sectors, each network sector configured for communicative association with one or more of the plurality of delay-tolerant wireless devices, and each network sector associated with a corresponding traffic threshold, the apparatus comprising:
   a. a user communication interface for receiving information indicating a need to communicate with one or more of the plurality of delay-tolerant wireless devices;
   b. a wireless communication system interface for establishing an operative coupling to the wireless communication system for receiving information regarding one or more network traffic levels, each network traffic level associated with a respective network sector; and
   c. a communication management system for evaluating the one or more network traffic levels, and for submitting one or more access-configuration messages in one or more network sectors when the evaluated network traffic level of a particular network sector is below the traffic threshold for that particular network sector; said one or more access-configuration messages for shifting one or more delay-tolerant wireless devices from an idle operational condition to an active operational condition, wherein each of the plurality of delay-tolerant wireless devices is configured, subsequent to shifting to the active operational condition, to perform a predetermined action and autonomously return to the idle operational condition.

10. The apparatus according to claim 9, wherein one or more of the access-configuration messages are configured to initiate communication with one or more of the plurality of delay-tolerant wireless devices.

11. A delay-tolerant wireless device for communication with a wireless communication system, the delay-tolerant wireless device comprising:
   a. a network interface for establishing an operative connection with the wireless communication system; and
   b. a control system operatively coupled to the network interface, the control system configured to control an operational condition of the delay-tolerant wireless device, the control system configured to shift the delay-tolerant wireless device from an idle operational condition to an active operational condition upon receipt of an access-configuration message; said access-configuration message for controlling network traffic associated with the delay-tolerant wireless device, wherein the delay-tolerant wireless device is configured, subsequent to shifting into the active operational condition, to perform a predetermined action and autonomously return to the idle operational condition.

12. The delay-tolerant wireless device according to claim 11, wherein the control system is configured to shift to the active operational condition at a time determined based upon information provided by the access-configuration message.

13. The delay-tolerant wireless device according to claim 11, wherein in the idle operational condition one or more predetermined components of the delay-tolerant wireless device are active.

14. The delay-tolerant wireless device according to claim 11, wherein in the active operational condition one or more predetermined components of the delay-tolerant wireless device are inactive.

15. A computer program product comprising a memory having computer readable code embodied therein, for execution by a CPU, for performing a method for managing communication with a plurality of delay-tolerant wireless devices in a wireless communication system, said plurality of delay-tolerant wireless devices being a subgroup of wireless devices in the wireless communication system, the wireless communication system comprising a plurality of network sectors, each network sector configured for communicative association with one or more of the plurality of delay-tolerant wireless devices, and each network sector associated with a corresponding traffic threshold, the method comprising:
   a. determining a need to communicate with one or more of the plurality of delay-tolerant wireless devices;
   b. evaluating one or more network traffic levels, each network traffic level associated with a respective network sector; and
   c. submitting one or more access-configuration messages in one or more network sectors when the evaluated network traffic level of a particular network sector is below the traffic threshold for that particular network sector; said one or more access-configuration messages for shifting one or more of the plurality of delay-tolerant wireless devices from an idle operational condition to an active operational condition, wherein each of the plurality of delay-tolerant wireless devices is configured, subsequent to shifting to the active operational condition, to perform a predetermined action and autonomously return to the idle operational condition.

* * * * *